United States Patent Office 3,290,579
Patented Dec. 6, 1966

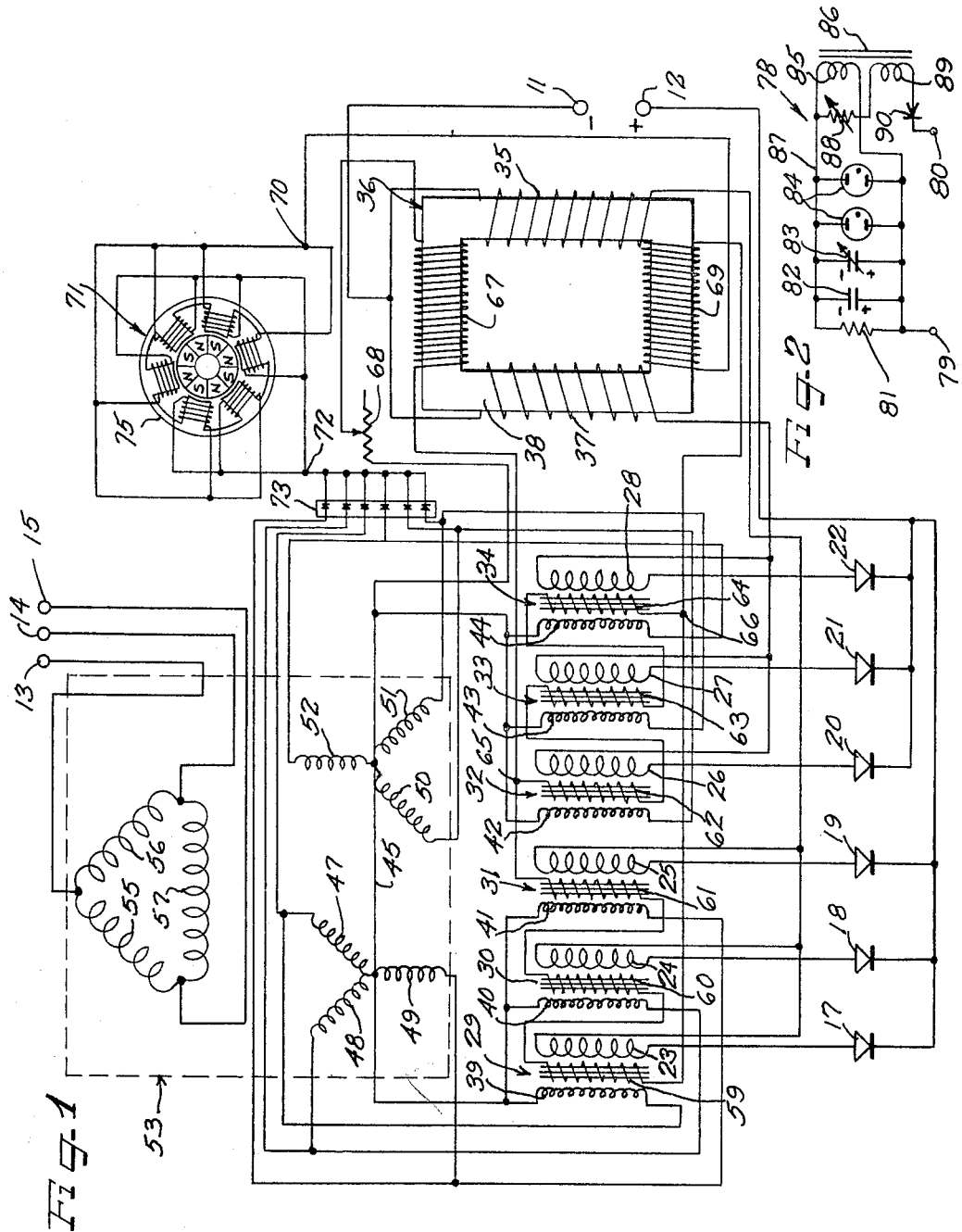

3,290,579
MULTI-PHASE A.C. TO D.C. CONVERTER WITH OUTPUT CONTROL MEANS
Johann Karl Hausner, 3832 N. Tripp Ave., Chicago, Ill.
Filed Oct. 30, 1963, Ser. No. 320,075
15 Claims. (Cl. 321—9)

This invention relates to an A.C. to D.C. converter and more particularly to a converter which develops a very stable output while being efficient and reliable in operation. An important feature of the converter is that it can develop either a pure D.C. output or a D.C. output with superimposed sharp D.C. pulses, as is highly desirable in some applications.

Converters are known in the art in which control devices such as devices having windings on saturable cores are used to control the A.C. applied to rectifiers which develop the D.C. output voltage. The converters of the prior art, however, have not produced a smooth D.C. output but have had a substantial ripple voltage or current which can be reduced to a tolerable value in many applications only by using large and expensive filter chokes and capacitors.

According to this invention, control currents are automatically applied to control windings of transformer devices in a manner which permits the reduction of ripple in the output of rectifiers connected to the devices to a very low value. With this arrangement, it is either not necessary to use filter chokes or capacitors or the required filtering can be obtained with chokes and capacitors of very small size.

An important feature of the invention is in the use of either a synchronous electric motor or an electronic control circuit to apply such control currents in a highly efficient and reliable manner. Another important feature of the invention is in the use of a transformer device in circuit with the rectifier output and the control windings of the control transformers to stabilize the operation of the converter.

An important advantage of the system of this invention is that it can be used to produce not only a substantially pure D.C. output but can also be used to produce sharp superimposed D.C. impulses of controlled and stabilized values in the output, as is highly desirable in many applications such as in electrolysis for example.

This invention contemplates other and more specific objects, features and advantages which will become more fully apparent from the following detailed description taken in conjunction with the accompanying drawing in which:

FIGURE 1 is a circuit diagram of an A.C. to D.C. converter constructed according to this invention; and FIGURE 2 is a circuit diagram of an electronic control circuit which may be used in place of a synchronous motor circuit of the circuit of FIGURE 1.

The illustrated converter, generally designated by reference numeral 10, functions to develop a D.C. output at negative and positive output terminals 11 and 12 from a three-phase A.C. input applied to input terminals 13, 14 and 15.

The positive terminal 12 is connected to the cathodes of six rectifiers 17–22 having anodes connected to terminals of six secondary windings 23–28 of six transformers 29–34. The rectifiers 17–22 are preferably silicon rectifiers although other types may be used.

The other terminals of the secondary windings 23–25 are connected through a winding 35 of a transformer device 36 to the negative output terminal 11, while the other terminals of the windings 26–28 are similarly connected through a winding 37 of the transformer device 36 to the negative output terminal 11.

The transformers 29–34 have primary windings 39–44 having terminals connected to a common bus 45 and the other terminals thereof are respectively connected to secondary windings 47–52 of a transformer 53, the other terminals of the secondary windings 47–52 being connected to the common bus 45. The transformer 53 has primary windings 55, 56 and 57, delta connected, with the junction between windings 55 and 56 connected to input terminal 13, the junction between windings 56 and 57 connected to input terminal 14 and the junction between windings 55 and 57 connected to the input terminal 15.

With the connection of the rectifiers and the windings of the transformers as thus far described, each of the rectifiers 17–22 may conduct for approximately 60° of each cycle of the input alternating current. Thus rectifier 17 may conduct for the 60° of a cycle when the voltage and winding 47 reaches a peak value, rectifier 21 during the next 60° when the voltage and winding 51 reaches a peak value and then rectifiers 19, 20, 18 and 22 in order. Without other circuitry, a substantial ripple voltage is produced at the output, having a fundamental frequency component of six times the input frequency. With the circuit of this invention, however, such ripple can be reduced to a minimum and it is also possible to obtain other modes of operation, depending upon the condition of operation of the circuit.

In particular, control windings 59–64 are provided on the cores of the transformers 29–34 and are arranged to control the reluctance of the cores of the transformers. Windings 59–61 are connected in circuit between circuit points 65 and 66 and windings 62–64 are also connected in series between the circuit points 65 and 66. Circuit point 65 is connected through a winding 67 on the core 38 of the transformer device 36 and thence through an adjustable resistor 68 to the bus 45. Circuit point 66 is connected through another winding 69 on the core 38 of the transformer device 36 to a circuit point 70 forming one terminal of a synchronous motor 71. A circuit point 72 forming a second terminal of the motor 71 is connected through a diode unit 73 which comprises six diodes, the cathodes thereof being connected to the circuit point 72 and the anodes thereof being connected to terminals of the windings 47–52.

As diagrammatically illustrated, the synchronous motor 71 comprises a field structure 75 having six poles with windings thereon connected in parallel between the terminals formed by circuit points 70 and 72. The motor 71 has an armature with permanent magnets forming six poles, three north poles and three south poles as diagrammatically indicated.

In operation, current at any particular instant of time flows from the one of the windings 47–52 having the highest positive potential, through one of the diodes of the block 73, thence through all of the windings of the field structure 75, thence through the winding 69, thence through the control windings 59–64, thence through winding 67 and thence through resistor 68 to the bus 45. During the application of voltage from each of the windings 47–52, the magnitude of the voltage increases to a peak value and then decreases, since it is the peak portion of a sine wave signal which is applied. As a result, the voltage applied to the windings of the motor 71 has a fundamental A.C. component at a frequency equal to six times the input frequency, and the motor is thereby operated at a corresponding speed. For example, with an input frequency of 60 cycles a 360-cycle signal is applied to the motor 71 and since it is a six-pole motor as illustrated, is operated at a speed of 7200 r.p.m.

As the armature 76 is rotated, the magnetic poles thereof induce voltages in the field windings of such phase that the current through the windings leads the voltage applied between terminals 70 and 72 by a phase angle on the order of 90°, the motor being operated without load. The phase lead so produced by the motor 71 opposes the phase lag produced by the inductance of the control windings 59–64. By proper adjustment of the resistor 68, a condition can be obtained in which the current through the control windings 59–64 operates to effectively balance out the ripple voltage otherwise produced in the manner as described above. This operation is further augmented by currents induced in windings 67 and 69 in response to changes in the output current, which operates to apply a feedback signal further reducing any ripple produced.

The circuit additionally functions to produce voltage stabilization due to the large value of the D.C. component applied through the control windings 59–64 to produce saturation in the cores of the transformers 29–34 in proportion to the applied input voltage and to thereby produce an output voltage substantially independent of input voltage over a certain range of values.

The circuit is thus operable to produce a substantially pure D.C. output, free of ripple. If desired, filter chokes and capacitors could be used in the output of the circuit to further reduce any remanent fluctuations. However, such chokes and capacitors, if used, can be of relatively small size and it is not necessary to use the large and expensive filter chokes and capacitors such as customarily employed.

The circuit is also operable in a somewhat different mode to uniformly produce sharp impulses in the output, as is desirable in some applications such as in electrolysis. In particular, by adjustment of the value of the resistor 68, the phase of the voltage can be changed to an extent such as to produce sharp peaks in the D.C. voltage at the output. The explanation of the generation of such peaks is quite complex, but in practice they are readily obtained by adjustment of the value of the resistor 68 while observing the form of the output voltage on an oscilloscope. An oscilloscope can also be used in adjusting the circuit to obtain a substantially pure D.C. output.

It is noteworthy that once adjusted to obtain either a pure D.C. output or to obtain a D.C. output with such sharp superimposed D.C. impulses, the circuit is extremely stable and reliable in operation and continual adjustments are not required.

FIGURE 2 illustrates an electronic control circuit 78 which may be used in place of the synchronous motor 71, terminals 79 and 80 of the circuit 78 being connectable to the circuit points 72 and 70, respectively. A resistor 81, a fixed capacitor 82, a variable capacitor 83, a pair of gaseous discharge tubes 84 and one winding 85 of a choke 86 are connected in parallel between terminal 79 and a line 87 which is connected to terminal 80 through a variable resistor 88, a second winding 89 of the choke 86 and an isolating diode 90.

In operation, the capacitors 82 and 83 are charged through a circuit including the diode unit 73, resistor 88, winding 89, diode 90, winding 69, windings 59–66, winding 67 and resitor 68. When the voltage across the capacitors reaches the break down voltage of the tubes 84, the capacitors are discharged therethrough, after which the capacitors again start to charge up. A sawtooth voltage is thus developed across the capacitors 82 and 83. By adjustment of capacitor 83 and resistors 68 and 88, the sawtooth voltage thus developed can be locked-in to the ripple voltage produced from the diode unit 73, having a frequency equal to six times the input frequency, and the phase and amplitude of the current through control windings 59–64 can be adjusted to either balance out the ripple voltage otherwise produced, or to uniformly produce sharp impulses in the output in the manner as described above.

It will be understood that modifications and variations may be effected without departing from the spirit and scope of the novel concepts of this invention.

I claim as my invention:

1. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and control means for applying to said control windings an A.C. control signal having the same fundamental frequency as said ripple voltage and in predetermined phase relation to said ripple voltage.

2. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and control means for applying to said control windings an A.C. control signal having the same fundamental frequency as said ripple voltage and in predetermined phase relation to said ripple voltage, said A.C. control signal being effectively applied in opposition to said ripple voltage to produce a substantially pure D.C. output voltage.

3. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and control means for applying to said control windings an A.C. control signal having the same fundamental frequency as said ripple voltage and in predetermined phase relation to said ripple voltage, said A.C. control signal being so applied as to develop a D.C. output voltage with superimposed D.C. impulses.

4. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and means including a synchronous motor connected in series with said control windings for applying to said control windings an A.C. control signal having the same fundamental frequency as said ripple voltage and in predetermined phase relation to said ripple voltage.

5. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C.

ripple voltage, diode means connected in circuit with said multi-phase system for developing a control voltage having an A.C. component synchronized with said ripple voltage, and means for applying said control voltage to said control windings for developing in said control windings an A.C. control signal in predetermined phase relation to said ripple voltage.

6. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and control means for applying to said control windings an A.C. control signal having the same fundamental frequency as said ripple voltage and in predetermined phase relation to said ripple voltage, said control means including means tending to produce a phase lead in current through said control windings to oppose the phase lag produced by the inductance of said windings.

7. In a converter having a multi-phase A.C. input and a D.C. output, a plurality of rectifiers connected to said output, a multi-phase system connected to said input and including a plurality of transformers having saturable cores, having control windings and having output windings connected in circuit with said rectifiers and said output and operative in the absence of signals on said control windings to develop a D.C. voltage at said output with a superimposed A.C. ripple voltage, diode means connected in circuit with said multi-phase system for developing a control voltage having a D.C. component and an A.C. component synchronized with said ripple voltage, and means for applying said control voltage to said control windings for developing in said control windings an A.C. control signal in predetermined phase relation to said ripple voltage with said D.C. component being effective to operate said cores in the region of saturation.

8. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, control means for applying to said control windings an A.C. control signal having the same fundamental frequency as said ripple voltage and in predetermined phase relation to said ripple voltage, and means for adjusting the relative phase and amplitude of said A.C. control signal.

9. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, control means for applying to said control windings an A.C. control signal having the same fundamental frequency as said ripple voltage and in predetermined phase relation to said ripple voltage, and means including resistance means in series with said control windings for adjusting the relative phase and amplitude of said A.C. control signal.

10. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, and transformer means having at least one winding connected between said rectifiers and said output and having at least one winding connected in series with said control windings to apply a feedback signal effectively opposing said ripple voltage.

11. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, control means for applying to said control windings an A.C. control signal having the same fundamental frequency as said ripple voltage and in predetermined phase relation to said ripple voltage, and transformer means having at least one winding connected between said rectifiers and said output and having at least one winding connected in series with said control windings to apply a feedback signal effectively opposing said ripple voltage.

12. In a converter having a three-phase A.C. input and a D.C. output, six transformers each having a primary winding, a secondary winding and a control winding, six rectifiers connecting said secondary windings to said outputs, means coupling said primary windings to said input and arranged to develop voltages in 60° phase relation in said secondary windings and to develop at said output a D.C. voltage with an A.C. ripple voltage at a frequency equal to six times the input frequency, six diodes connected in circuit with said primary windings for developing a control voltage having an A.C. component at the frequency of said ripple voltage, and means including a synchronous motor for applying said control voltage to said control windings for developing in said control windings an A.C. control signal in predetermined phase relation to said ripple voltage.

13. In a converter having a three-phase A.C. input and a D.C. output, six transformers each having a primary winding, a secondary winding and a control winding, six rectifiers connecting said secondary windings to said outputs, means coupling said primary windings to said input and arranged to develop voltages in 60° phase relation in said secondary windings and to develop at said output a D.C. voltage with an A.C. ripple voltage at a frequency equal to six times the input frequency, six diodes connected in circuit with said primary windings for developing a control voltage having an A.C. component at the frequency of said ripple voltage, and means including a synchronous motor for applying said control voltage to said control windings for developing in said control windings an A.C. control signal in predetermined phase relation to said ripple voltage, said transformers having saturable cores with said D.C. component being effective to operate said cores in the region of saturation.

14. In a converter having a three-phase A.C. input and a D.C. output, six transformers each having a primary winding, a secondary winding and a control winding, six rectifiers connecting said secondary windings to said outputs, means coupling said primary windings to said input and arranged to develop voltages in 60° phase relation in said secondary windings and to develop at said output a D.C. voltage with an A.C. ripple voltage at a frequency equal to six times the input frequency, six diodes connected in circuit with said primary windings for developing a control voltage having an A.C. component at the frequency of said ripple voltage, means including a synchronous motor for applying said control votlage to said control windings for developing in said control windings an A.C. control signal in predetermined phase relation to said ripple voltage, and means for adjusting the relative phase and amplitude of said A.C. component of said control voltage.

15. In a converter having a multi-phase A.C. input and a D.C. output, a plurality of rectifiers connected to said output, a multi-phase system connected to said input and including a plurality of transformers having control windings and having output windings connected in circuit with said rectifiers and said output and operative in the absence of signals on said control windings to develop a D.C. voltage at said output with a superimposed A.C. ripple voltage, a capacitor, means for charging and discharging said capacitor for developing an A.C. control signal having the same fundamental frequency as said ripple voltage and in predetermined phase relation to said ripple voltage, and means for applying said A.C. control signal to said control windings.

No references cited.

JOHN F. COUCH, *Primary Examiner.*

W. H. BEHA, JR., *Assistant Examiner.*